United States Patent
Yoda

(10) Patent No.: US 8,179,583 B2
(45) Date of Patent: May 15, 2012

(54) ACTUATOR, OPTICAL SCANNER AND IMAGE FORMING DEVICE

(75) Inventor: Mitsuhiro Yoda, Shiojiri (JP)

(73) Assignee: Seiko Epson Corporation (JP)

( * ) Notice: Subject to any disclaimer, the term of this patent is extended or adjusted under 35 U.S.C. 154(b) by 267 days.

(21) Appl. No.: 12/712,324

(22) Filed: Feb. 25, 2010

(65) Prior Publication Data

US 2010/0149613 A1 Jun. 17, 2010

Related U.S. Application Data

(63) Continuation of application No. 12/110,432, filed on Apr. 28, 2008, now Pat. No. 7,697,185.

(30) Foreign Application Priority Data

Jun. 5, 2007 (JP) ................................. 2007-149560

(51) Int. Cl.
*G02B 26/08* (2006.01)

(52) U.S. Cl. ............... 359/224.1; 359/199.3; 359/200.7; 310/66

(58) Field of Classification Search .... 359/198.1–199.1, 359/199.3, 200.7, 224.1–224.2; 310/36, 310/40 R, 66

See application file for complete search history.

(56) References Cited

U.S. PATENT DOCUMENTS

| | | | |
|---|---|---|---|
| 2003/0218787 A1* | 11/2003 | Miyajima et al. | 359/199 |
| 2007/0025659 A1 | 2/2007 | Yoda | |
| 2007/0146858 A1 | 6/2007 | Matsuda | |
| 2008/0144154 A1 | 6/2008 | Asai | |

FOREIGN PATENT DOCUMENTS

| | | |
|---|---|---|
| JP | 2004-191953 | 7/2004 |
| JP | 2006-330399 | 12/2006 |
| JP | 2006-330505 | 12/2006 |
| JP | 2007-006587 | 1/2007 |
| JP | 2007-025608 | 2/2007 |

* cited by examiner

*Primary Examiner* — James Phan
(74) *Attorney, Agent, or Firm* — Harness, Dickey & Pierce, P.L.C.

(57) ABSTRACT

An actuator includes a movable plate having a plate shape, a pair of axial parts that is elastically deformable and supporting the movable plate rotatable, and a tension adjuster adjusting tension on an axial direction of the pair of the axial parts and including a torsional axis that is formed jointly or integrally with one of the axial parts and disposed orthogonally to the axial direction of the axial parts, and a drive source that torsionally deforms the torsional axis, wherein the torsional axis is torsionally deformed through the action of the drive source and a spring constant of the pair of the axial parts is adjusted by adjusting the tension on the pair of the axial parts.

3 Claims, 5 Drawing Sheets

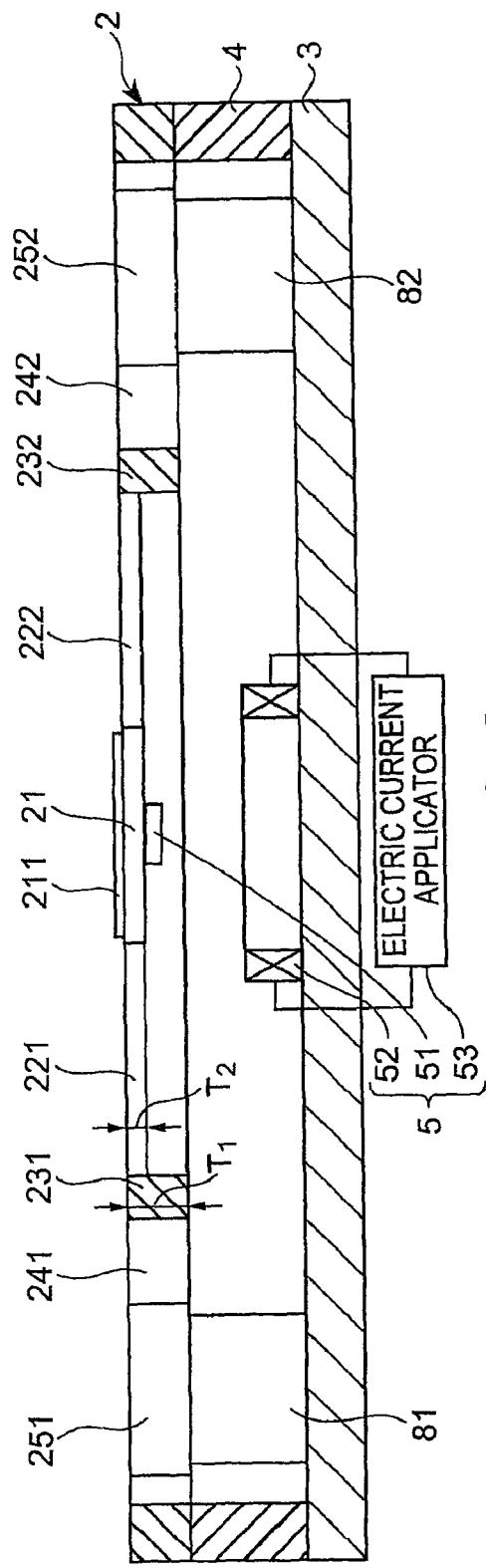
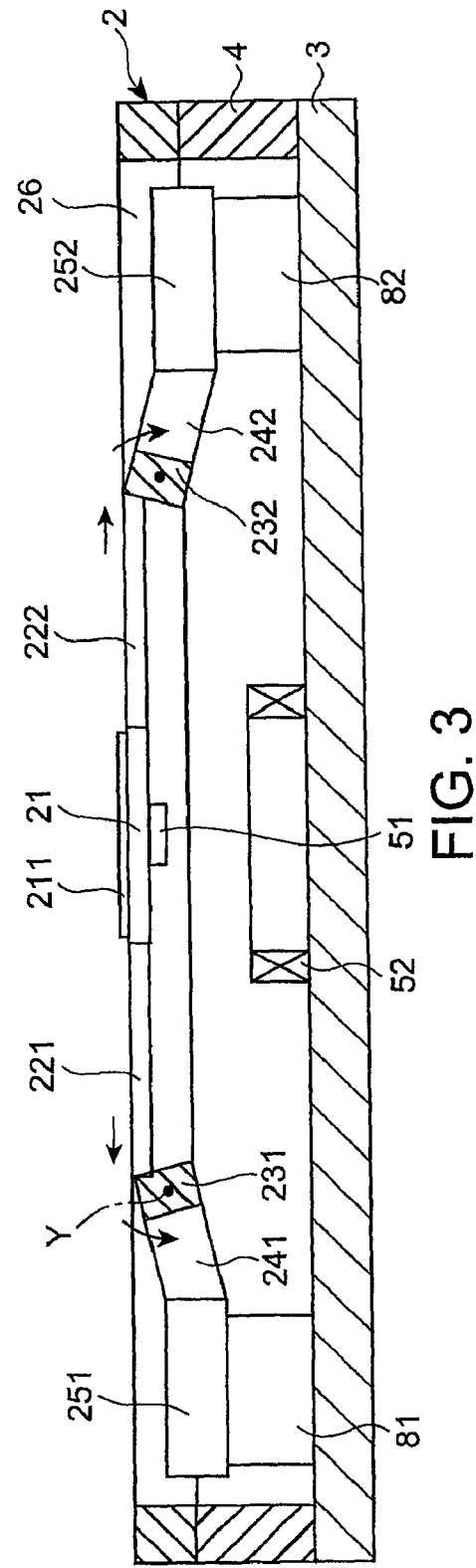
FIG. 2
FIG. 3

ACTUATOR, OPTICAL SCANNER AND IMAGE FORMING DEVICE

CROSS-REFERENCE TO RELATED APPLICATIONS

This application is a continuation application of U.S. Ser. No. 12/110,432 filed Apr. 28, 2008, now U.S. Pat. No. 7,697,185, which claims priority to Japanese Patent Application No. 2007-149560 filed Jun. 5, 2007, all of which are hereby expressly incorporated by reference herein in their entirety.

BACKGROUND OF THE INVENTION

1. Technical Field

The present invention relates to an actuator, an optical scanner and an image forming device.

2. Related Art

An optical scanner is embedded in a laser printer or the like. The optical scanner is used for drawing an image through optical scanning. JP-A-2004-191953 is an example of related art. The example discloses an optical scanner that has an actuator using a torsional vibrating element. The actuator (optical scanner) according to the example has a torsional vibrating element of a single-degree-of-freedom vibration system. More specifically the actuator has a movable plate (a reflecting mirror part) which is supported by a support part (a fixing frame) through an axial part (a spring part) such that the movable plate is rotatable with respect to the support part.

The movable plate rotates when the axial part is distorted and deformed. Light is reflected at the light reflecting part and scanning is performed. In this way, an image can be drawn through the optical scanning.

In the actuator according to the example, weight of the movable plate and a spring constant of the axial part are fixed so that the actuator can only be driven at a given resonance frequency once it is fabricated. This means if the weight of the movable plate and the spring constant of the axial part become different from a design value of the actuator, the resonance frequency also becomes different from a desired value. For this reason, it is difficult to obtain an actuator that has a desired rotating-motion characteristic.

SUMMARY

An advantage of the present invention is to provide an actuator in which a resonance frequency of a movable plate can be easily and accurately adjusted even after it is manufactured and which can exercise a desired vibration characteristic. Another advantage of the invention is to provide an optical scanner and an image forming device thereof.

An actuator according to a first aspect of the invention includes a movable plate having a plate shape, a pair of axial parts that is elastically deformable and supporting the movable plate rotatable, and a tension adjuster adjusting tension on an axial direction of the pair of the axial parts and including a torsional axis that is formed jointly or integrally with one of the axial parts and disposed orthogonally to the axial direction of the axial parts, and a drive source that torsionally deforms the torsional axis, wherein the torsional axis is torsionally deformed through operation of the drive source and a spring constant of the pair of the axial parts is adjusted by adjusting the tension on the pair of the axial parts. In this way, it is possible to provide an actuator in which a resonance frequency of a movable plate can be easily and accurately adjusted even after it is manufactured and which can exercise a desired vibration characteristic.

It is preferable that the tension adjuster has a pair of the torsional axes corresponding to the pair of the axial parts and a pair of the drive sources corresponding to the pair of the torsional axes. In this way it is possible to adjust the tension on the pair of the axial parts (or the spring constant of the pair of the axial parts) in a wide range.

It is preferable that a torsional center of the torsional axis be disposed at a distance from a joint part of the torsional axis with the axial part in a thickness direction of the movable plate. It is also preferable that both ends of the torsional axis in its axial direction be fixed. In this way it is possible to deform the torsional axis torsionally with a relatively small force.

It is preferable that the torsional axis be coupled with the axial part at a center part of the torsional axis in the axial direction. In this way it is possible to adjust the tension on the pair of the axial parts in a wider range with a smaller force. It is also preferable that the drive source torsionally deform the torsional axis toward a direction in which the tension on the pair of the axial parts is increased. In this way it is possible to prevent the pair of the axial parts from being warped and it is also possible to adjust the tension on the pair of the axial parts while securing a stable ration of the movable plate.

Moreover, it is preferable that the drive source further include a piezoelectric element contracting and elongating in a direction orthogonal to the axial direction of the axial part and to an axial direction of the torsional axis, a piezoelectric element joint part jointed with an end of the piezoelectric element in a contraction and elongation direction of the piezoelectric element, and a coupling part coupling the piezoelectric element joint part with the torsional axis, wherein the piezoelectric element joint part is displaced through contraction and elongation of the piezoelectric element, and the torsional axis is torsionally deformed through the displacement of the coupling part caused by the contraction and elongation of the piezoelectric element. In this way it is possible to deform the torsional axis torsionally with a relatively simple mechanism.

It is preferable that the piezoelectric joint part be disposed in an opposite side to the movable plate with respect to the torsional axis. In this way it is possible to increase design freedom of the actuator. It is also preferable that the coupling part be coupled with a center part of the torsional axis in the axial direction of the torsional axis. In this way it is possible to deform the torsional axis torsionally with a small force.

It is preferable that the coupling part be disposed along an axial line of the axial part when it is viewed from a plane of the movable plate. In this way, the force generated through the contraction and elongation of the piezoelectric element can be efficiently transmitted to the torsional axis. It is also preferable that the piezoelectric element have a structure in which piezoelectric layers and electrode layers are alternately deposited on top of each other. By adopting such piezoelectric element, a driving voltage can be lowered and the amount of the displacement can be increased.

It is preferable that the actuator further include a driver rotating the movable plate where electricity is turned on, wherein the tension adjuster adjusts the tension on the pair of the axial parts such that a frequency of a voltage that is applied to the driver becomes same as a resonance frequency of the movable plate. In this way, it is possible to rotate the movable plate with large amplitude as well as lowering the driving voltage level. Furthermore, it is preferable that the actuator further include a light reflecting part having a light reflection property and disposed on one face of the movable plate. In this way, the actuator can be applied to various optical devices such as an optical scanner, an optical switch and an optical attenuator.

In this case, it is preferable that the drive source further include a piezoelectric element contracting and elongating in a direction orthogonal to the axial direction of the axial part and to an axial direction of the torsional axis, a piezoelectric element joint part jointed with an end of the piezoelectric element in a contraction and elongation direction of the piezoelectric element, and a coupling part coupling the piezoelectric element joint part with the torsional axis, wherein the piezoelectric element is disposed in an opposite side to the light reflecting part with respect to the movable plate. In this way it is possible to increase design freedom of the actuator.

An optical scanner according to a second aspect of the invention includes a movable plate having a plate shape and having a light reflecting part that has a light reflecting property and is disposed on a plate face of the movable plate; a pair of axial parts that is elastically deformable and supporting the movable plate rotatable; and a tension adjuster adjusting tension on an axial direction of the pair of the axial parts and including a torsional axis that is formed jointly or integrally with one of the axial parts and disposed orthogonally to the axial direction of the axial parts, and a drive source that torsionally deforms the torsional axis, wherein the torsional axis is torsionally deformed through operation of the drive source and a spring constant of the pair of the axial parts is adjusted by adjusting the tension on the pair of the axial parts. In this way, it is possible to provide an optical scanner in which a resonance frequency of a movable plate can be easily and accurately adjusted even after it is manufactured and which can exercise a desired vibration characteristic.

An image forming device according to a third aspect of the invention includes an optical scanner that has a movable plate having a plate shape and having a light reflecting part that has a light reflecting property and is disposed on a plate face of the movable plate, a pair of axial parts that is elastically deformable and supporting the movable plate rotatable, and a tension adjuster adjusting tension on an axial direction of the pair of the axial parts and including a torsional axis that is formed jointly or integrally with one of the axial parts and disposed orthogonally to the axial direction of the axial parts, and a drive source that torsionally deforms the torsional axis, wherein the torsional axis is torsionally deformed through the action of the drive source and a spring constant of the pair of the axial parts is adjusted by adjusting the tension on the pair of the axial parts. In this way it is possible to provide an image forming device that can exert a fine image drawing characteristic.

BRIEF DESCRIPTION OF THE DRAWINGS

The invention will be described with reference to the accompanying drawings, wherein like numbers reference like elements.

FIG. 2 is a sectional view of the actuator along the line A-A in FIG. 1.

FIG. 3 is a schematic sectional view for describing movements of a tension adjuster which is disposed in the actuator shown in FIG. 1.

DESCRIPTION OF EXEMPLARY EMBODIMENTS

Embodiments of the invention will be described with reference to the accompanying drawings. The embodiments include an actuator, an optical scanner and an image forming device.

Figure 1:
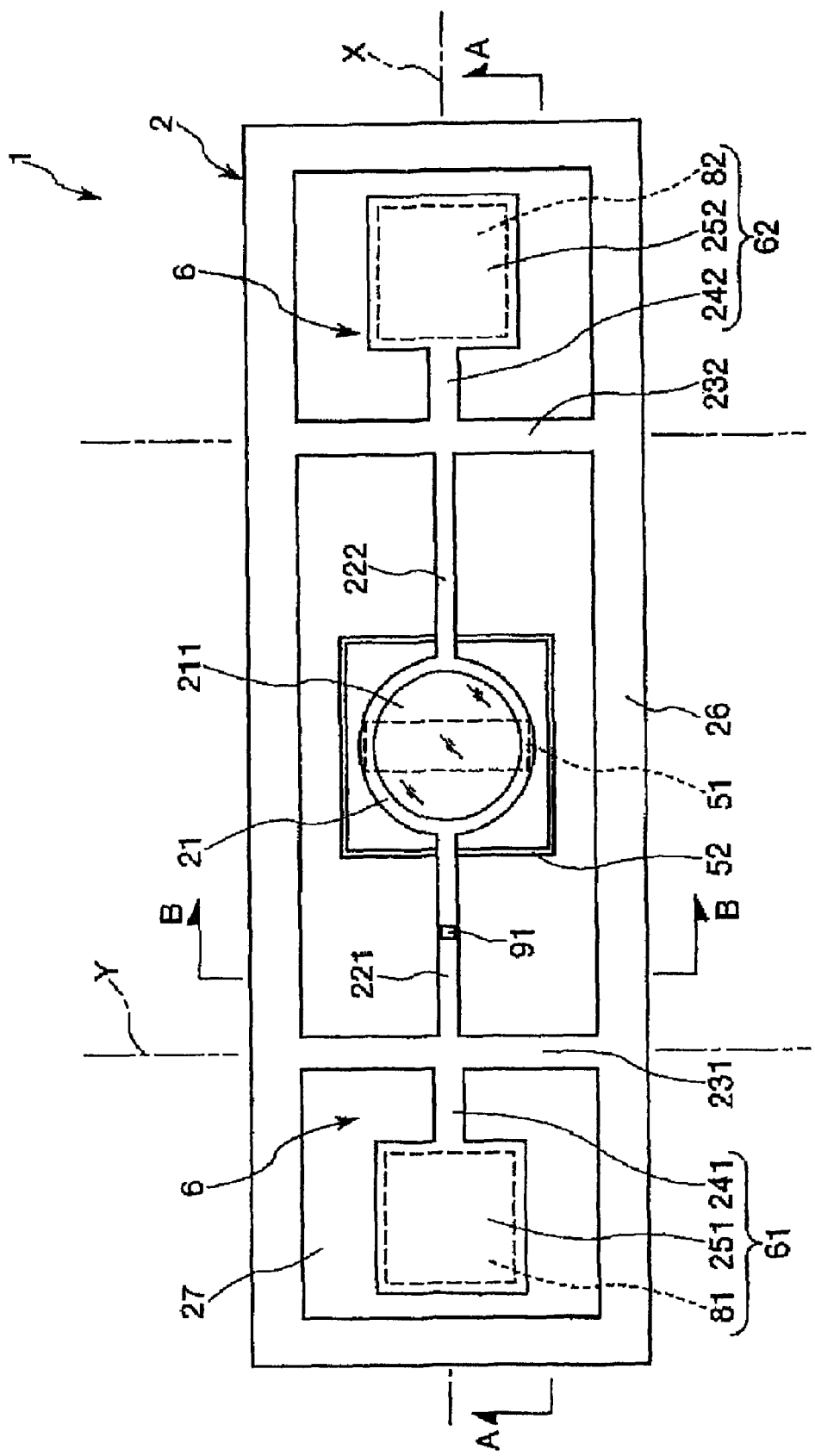
FIG. 1 is a schematic plan view of an actuator according to an embodiment of the invention.
Figure 4:
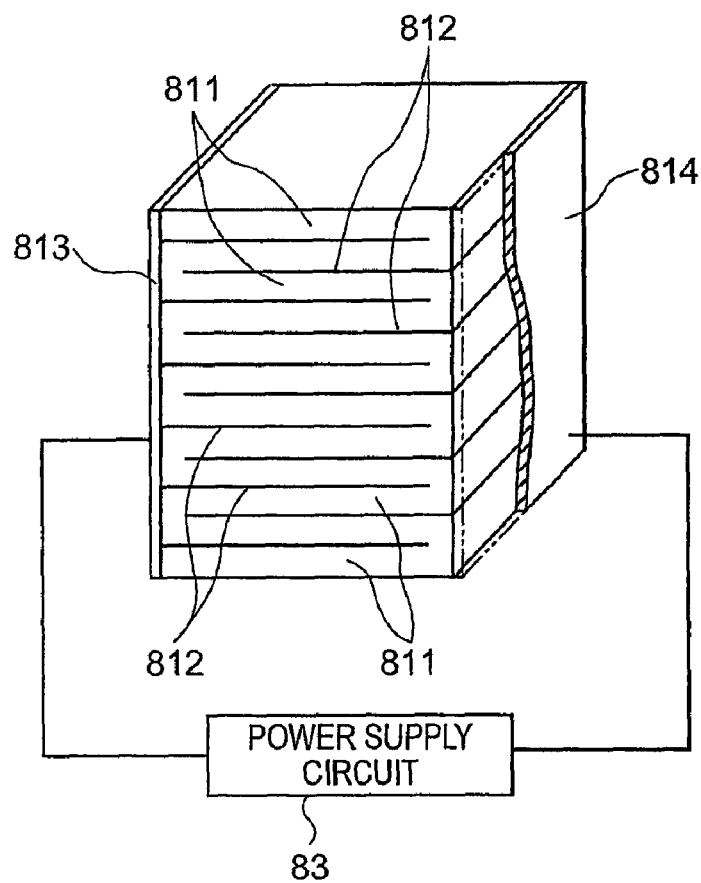
FIG. 4 is a schematic sectional view of a piezoelectric element disposed in the actuator shown in FIG. 1.
Figure 5:
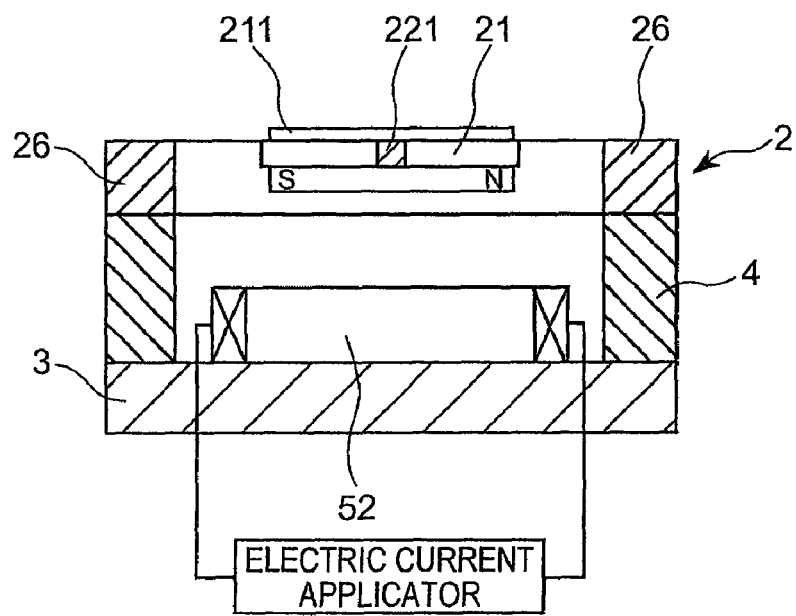
FIG. 5 is a sectional view of the actuator along the line B-B in FIG. 1.
Figure 6:
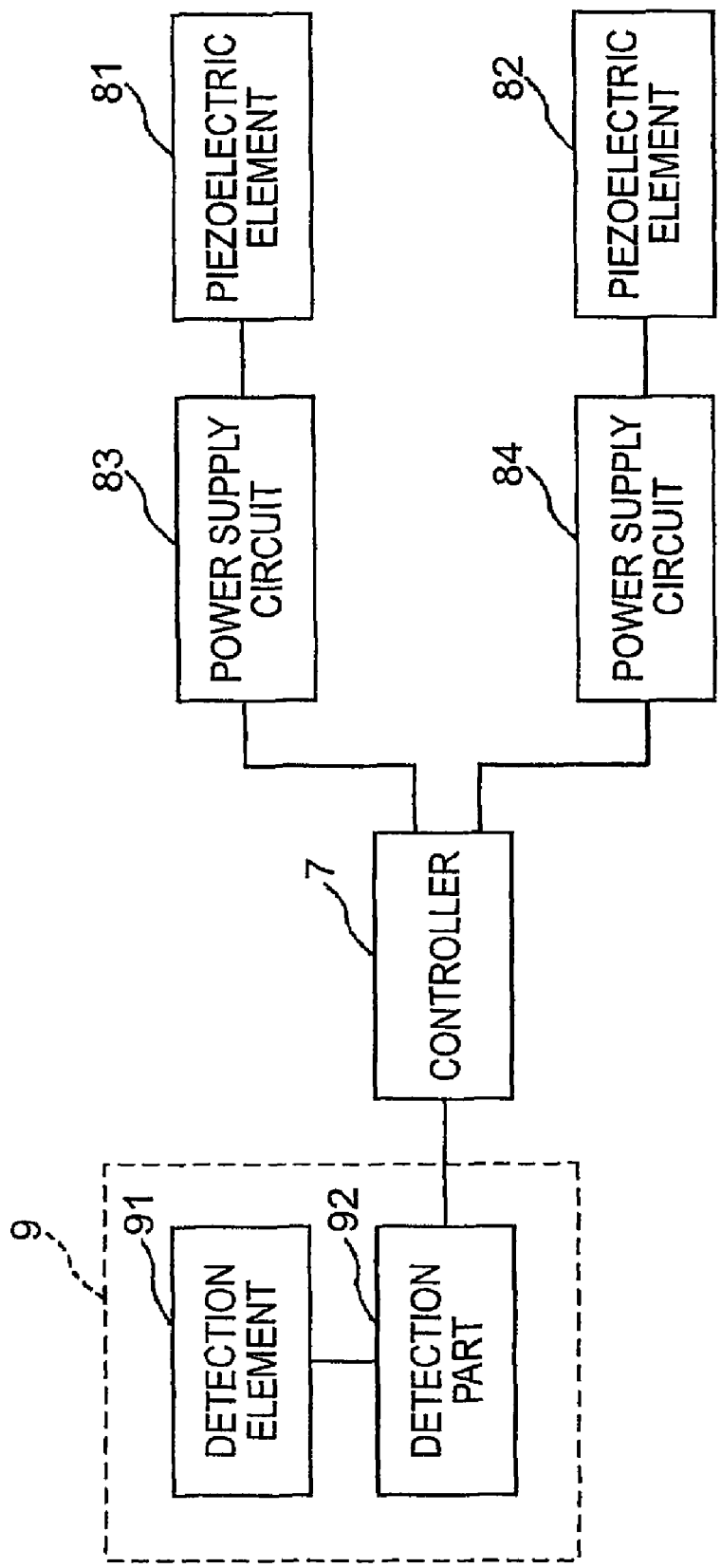
FIG. 6 is a block diagram of a control system.

FIG. 1 is a schematic plan view of an actuator according to a first embodiment of the invention. FIG. 2 is a sectional view of the actuator along the line A-A in FIG. 1. FIG. 3 is a schematic sectional view for describing movements of a tension adjuster which is disposed in the actuator shown in FIG. 1. FIG. 4 is a schematic sectional view of a piezoelectric element disposed in the actuator shown in FIG. 1. FIG. 5 is a sectional view of the actuator along the line B-B in FIG. 1. FIG. 6 is a block diagram of a control system. In the following description, near, far, right and left sides in FIG. 1 will be referred to as "upper," "lower," "right," and "left," respectively. Upper, lower, right and left sides in FIGS. 2, 3 and 5 will be referred to as "upper," "lower," "right," and "left," respectively for the purposes of illustration.

Referring to FIG. 1, an actuator 1 includes a base body 2, a support substrate 3 that supports the base body 2 through a spacer 4, a driver 5 that rotates a movable plate 21 which is provided in the base body 2, a tension adjuster 6 for adjusting the tension on a pair of axial parts 221, 222 which is disposed in the base body 2, and a controller 7 that controls the operation of the tension adjuster 6.

These components are now hereunder described. Referring to FIG. 1, the base body 2 includes the movable plate 21, a pair of the axial parts 221, 222 that support the movable plate 21 at the both sides of the plate, a pair of torsional axes 231, 232 that are coupled to the axial parts 221, 222 respectively, a support part 26 that supports the torsional axes 231, 232 and has a frame shape, a pair of piezoelectric element joint parts 251, 252 that are jointed with hereinafter-described piezoelectric elements 81, 82 respectively, and coupling parts 241, 242 that couple the piezoelectric element joint parts 251, 252 with the torsional axes 231, 232.

Referring to FIG. 1, in this embodiment, the pair of the axial parts 221, 222, the pair of the torsional axes 231, 232, the pair of the piezoelectric element joint parts 251, 252 and a pair of the coupling parts 241, 242 are disposed symmetrically with respect to the movable plate 21. The pair of the axial parts 221, 222, the pair of the torsional axes 231, 232, the pair of the piezoelectric element joint parts 251, 252 and the pair of the coupling parts 241, 242 respectively have the same structure each other in the pair.

The axial part 221, the torsional axis 231, the piezoelectric element joint part 251 and the coupling part 241 that are placed in the left side with respect to the movable plate 21 in FIG. 1 are hereunder described and the descriptions of the axial part 222, the torsional axis 232, the piezoelectric element joint 252 and the coupling part 242 that are disposed in the right side to the movable plate 21 in FIG. 1 will be omitted since those structures are the same as the corresponding ones situated in the left side.

The movable plate 21 has a disc shape in this embodiment. The shape of the movable plate 21 is not particularly limited to this. For example, it can be an oval shape, a square shape or the like when the plate is viewed in plan. A light reflecting part 221 which has a light reflecting property is formed on an upper face (a face opposite to the one closer to the support substrate 3) of the movable plate 21. A permanent magnet 51 is provided on the lower face of the movable plate 21. The movable plate 21 is supported by the pair of the axial parts 221, 222 at its both sides.

Referring to FIG. 1, the axial part 221 has a rod shape. One end of the axial part 221 in the longitudinal direction (the right side end in FIG. 1) is coupled to the movable plate 21 and the other end (the left side end in FIG. 1) is coupled to the torsional axis 231. The pair of the axial parts 221, 222 are provided coaxially and the movable plate 21 rotates with respect to the support part 26 around the axis or a rotation central axis X.

Referring to FIG. 1, the torsional axis 231 is formed such that it is torsionally deformable around a Y axis which is placed orthogonal to the rotation central axis X (or the axial direction of the axial parts 221, 222) and to the thickness direction of the movable plate 21. The actuator 1 adjusts the spring constant of the pair of the axial parts 221, 222 by a hereinafter described drive source 61. The drive source 61 deforms the torsional axis 231 torsionally around the Y axis and the tension on the pair of the axial parts 221, 222 is adjusted.

The torsional axis 231 has a long shape extending along the Y axis and its both ends are fixed to the support part 26. When the torsional axis 231 is made so as to have the long shape extending along the Y axis, the torsional axis 231 can be deformed torsionally around the Y axis with a relatively small force. The center part of the torsional axis 231 in the longitudinal direction is coupled to the axial part 221. As described above, the torsional axis 231 is fixed to the support part 26 at its both ends in the longitudinal direction. Therefore the center part of the torsional axis 231 in its longitudinal direction is the part which is most deformable around the Y axis (in other words the part which can be torsionally deformed most largely with a smallest force). Because the axial part 221 is jointed to such part according to the embodiment, it is possible to adjust the tension on the axial parts 221, 222 in an extensive area with a minimum force.

Moreover, where T1 denotes a thickness (thickness in the vertical direction in FIG. 2) of the torsional axis 231 and T2 denotes a thickness (thickness in the vertical direction in FIG. 2) of the axial part 221, T1 is larger than T2 according to the embodiment. Furthermore, the Y axis is situated in a position lower than the joint part of the torsional axis 231 and the axial part 221 as shown in FIG. 2. In this way, the gap between the movable plate 21 and the support substrate 3 can be made large and the movable plate 21 can be rotated with large amplitude. The positional relation between the Y axis and the joint part of the torsional axis 231 and the axial part 221 is not particularly limited. For example, the Y axis can be situated in upper side with respect to the joint part of the torsional axis 231 and the axial part 221 in FIG. 2.

The upper face of the torsional axis 231 and the upper face of the axial part 221 are disposed so as to form a flat face. Thereby if the base body 2 is formed by etching a silicon substrate for example, the axial part 221 having the thickness T2 which is smaller than the thickness T1 of the torsional axis 231 can be formed only by removing one side of the silicon substrate. In this way it is possible to simplify the manufacturing process of the base body 2. However the upper face of the torsional axis 231 and the upper face of the axial part 221 are not necessarily disposed to form a flat face Though it depends on the shape, size and the like of the torsional axis 231, the degree of the torsion of the torsional axis 231 is usually very small when the tension on the pair of the axial parts 221, 222 is adjusted. Thereby the movable plate 21 is hardly displaced even when the torsional axis 231 is torsionally deformed. In other words, the actuator 1 can adjust the tension on the pair of the axial parts 221, 222 while controlling the displacement of the movable plate 21. Therefore, where the actuator 1 is used as an optical device, the distance between an unshown light source and a light reflecting part 211 can be maintained at a desired distance and a light beam which is emitted from the light source and reflected by the light reflecting part 211 can be directed to a desired position of a scanning object.

The piezoelectric element joint part 251 is disposed in a space 27 which is defined by the torsional axis 231 and the left part of the support part 26. The piezoelectric element joint part 251 is placed an opposite side to the movable plate 21 with respect to the torsional axis 231. In this way, freedom of the arrangement of the piezoelectric element joint part 251 (disposition of the piezoelectric element 81) is increased and the design freedom of the actuator 1 can be improved.

The piezoelectric element joint part 251 has a plate shape and the hereinafter described piezoelectric element 81 is jointed to the lower face of the piezoelectric element joint part 251. Though the shape of the piezoelectric element joint part 251 is a substantially square in this embodiment when it is viewed in plan from the movable plate 21, the shape is not limited to this and it can be a rectangular shape, a disc shape or the like. The piezoelectric element joint part 251 is coupled to the torsional axis 231 through the coupling part 241.

The coupling part 241 has a long shape and is disposed along the rotation central axis X when it is viewed in plan in FIG. 1. One end (the right end) of the coupling part 241 in its longitudinal direction is coupled to the torsional axis 231, and the other end (the left end) is coupled to the piezoelectric element joint part 251. The coupling part 241 is jointed to the longitudinally center part of the torsional axis 231. A width of the coupling part 241 (the length in the Y-axis direction) is slightly larger than the width of the axial part 221. A thickness of the coupling part 241 is about the same as the thickness of the torsional axis 231.

The shape of the coupling part 241 is not particularly limited provided that it couples the piezoelectric element joint part 251 with the torsional axis 231. For example, the coupling part 241 does not necessarily have a long shape, the width of the coupling part 241 can be smaller than the width of axial part 221, and the thickness of the coupling part 241 can be larger than the thickness of the torsional axis 231. The coupling part 241, the piezoelectric element joint part 251 and the piezoelectric element 81 form the drive source 61 which deforms the torsional axis 231 torsionally around the Y axis. This means that the drive source 61 is placed in the space 27.

The base body 2 is for example mainly made of silicon. The movable plate 21, the pair of the axial parts 221, 222, the pair of the torsional axes 231, 232, the pair of the piezoelectric element joint parts 251, 252, the pair of the coupling parts 241, 242 and the support part 26 are formed such that they form a single body. For example, a silicon substrate is provided and the silicon substrate is etched so as to obtain the planer shapes corresponding to the movable plate 21, the pair of the axial parts 221, 222, the pair of the torsional axes 231, 232, the pair of the piezoelectric element joint parts 251, 252, the pair of the coupling parts 241, 242 and the support part 26. In this way it is possible to obtain the base body 2 in which the movable plate 21, the pair of the axial parts 221, 222, the pair of the torsional axes 231, 232, the pair of the piezoelectric element joint parts 251, 252, the pair of the coupling parts 241, 242 and the support part 26 are integrally formed. Moreover by adopting silicon as a main material, a fine rotation characteristic can be realized and an excellent durability can be obtained. Furthermore a micron-order processing (microfabrication) becomes possible thus the size of the actuator 1 can be made small.

Referring to FIG. 2, the above-described base body is supported by the support substrate 3 through the spacer 4. The spacer 4 is for example mainly made of glass or silicon. The spacer 4 is formed so as to have substantially the same shape as that of the support part 26 when it is viewed in plan. More specifically the spacer 4 has a frame shape.

An inner wall of the spacer 4 defines a space 41. The space 41 prevents the movable plate 21 from contacting with the support substrate 3 when the actuator 1 is driving. A shape of the spacer 4 is not particularly limited provided that it permits the rotation of the movable plate 21. The support substrate 3 has a plate shape and is mainly maid of for example glass or silicon. The support substrate 3 is disposed so as to oppose the lower face (the face opposite to the one closer to the light reflecting part 211) of the base body 2 with the spacer 4 interposed therebetween.

Referring to FIG. 2, a coil 52 is provided on the upper face (the face opposing the base body 2) of the support substrate 3 at a position opposing to the movable plate 21. In other words, the coil 52 is disposed so as to face the permanent magnet 51 which is disposed on the lower face of the movable plate 21. The coil 52 is coupled to an electric current applicator 53. The permanent magnet 51, the coil 52 and the electric current applicator 53 form the driver 5 that rotates the movable plate 21. The driver 5 will be described later in detail.

The piezoelectric element 81 is provided on the upper face of the support substrate 3 and at the position opposing to the piezoelectric element joint part 251. In addition, the piezoelectric element 82 is provided on the upper face of the support substrate 3 and at the position opposing to the piezoelectric element joint part 252. The piezoelectric elements 81, 82 are now described but the piezoelectric elements 81, 82 have the same structure each other, therefore only the piezoelectric element 81 is hereunder described and the description of the piezoelectric element 82 will be omitted.

The piezoelectric element 81 is disposed opposite to the light reflecting part 211 with respect to the base body 2. Thereby it is possible to increase the design freedom of the actuator 1. One end (an upper end) of the piezoelectric element 81 in its contraction and elongation direction is coupled to the lower face of the piezoelectric element joint part 251, and the other end (a lower end) of the piezoelectric element 81 is coupled to the upper face of the support substrate 3. In other words, the piezoelectric element 81 is sandwiched between the support substrate 3 and the piezoelectric element joint part 251. The piezoelectric element 81 elongates and contracts in the thickness direction of the movable plate 21 when electricity runs through the element.

Referring to FIG. 4, the piezoelectric element 81 has a square shape when it is viewed in plan. A plurality of piezoelectric layers 811 having a piezoelectricity and a plurality of electrode layers 812 are alternately formed on top of each other and form the piezoelectric element 811. A voltage is applied to the piezoelectric layer 811 through the adjacent electrode layer 812. With such layered-type piezoelectric element 81, it is possible to lower the driving voltage and increase the amount of the displacement. The piezoelectric layers 811 are disposed such that the two adjacent piezoelectric layers 811 have an opposite polarity direction. In other words, the piezoelectric layer 811 which is situated as an odd-numbered layer counted from the support substrate 3 side among the plurality of the piezoelectric layers 811 has an opposite direction of polarity to that of the piezoelectric layer 811 which is situated as an even-numbered layer. In this way, the driving voltage can be securely reduced and the amount of the displacement of the piezoelectric element 81 can be increased. In this description, the "polarity direction" means the direction in which a negative charge in the plane of a piezoelectric layer where negative charges excessively exist moves to the plane of the piezoelectric layer where positive charges excessively exist under the condition where neither an electric field nor a stress is applied to the piezoelectric layer, the negative charges excessively exit around one surface of the piezoelectric layer and the positive charges excessively exist around the other surface of the piezoelectric layer (spontaneous polarization or remanent polarization).

Each electrode layer 812 is interposed between the two adjacent piezoelectric layers 811. The plurality of the electrode layers 812 are provided such that the two adjacent electrode layers 812 have an overlapping area (an active region). Among the plurality of the electrode layers 812, the odd-numbered electrode layers 812 counted from the support substrate 3 side are coupled to a common electrode 813 which is disposed on a side face of the piezoelectric element 81, and the even-numbered electrode layers 812 are coupled to a common electrode 814 which is disposed on the other side face of the piezoelectric element 81.

The common electrodes 813, 814 are coupled to a power supply circuit 83. The power supply circuit 83 applies a voltage to the common electrodes 813, 814 and voltage is then supplied to each piezoelectric layer 811 through the above-mentioned overlapping area. Accordingly each piezoelectric layer 811 is elongated and contracted in the thickness direction. The common electrodes 813, 814 are not necessarily disposed on the side faces of the piezoelectric element 81. They can be provided for example on the support substrate 3. Moreover, the common electrodes 813, 814 are not necessarily provided. The odd-numbered electrode layers 812 counted from the support substrate side and the even-numbered electrode layers 812 are respectively coupled directly with the power supply circuit 83 instead.

As a piezoelectric material forming the piezoelectric layers 811, there are for example zinc oxide, aluminum nitride, lithium tantalate, lithium niobate, niobate potassium, piezoelectric zirconate titanate (PZT), barium titanate, and the like. One or more than one of the above-mentioned material combined can be used to form the piezoelectric layers 811. Particularly a material mainly composed of at least one of the zinc oxide, the aluminum nitride, the lithium tantalate, the lithium niobate, the niobate potassium and piezoelectric zirconate titanate is preferable. By adopting such material to form the piezoelectric layers 811, it is possible to drive the actuator 1 at a higher frequency.

The actuator 1 according to the embodiment has been described. Such actuator 1 torsionally deforms the torsional axis 231 through the action of the drive source 61 and simultaneously deforms the torsional axis 232 torsionally through the action of the drive source 62. In this way, the actuator 1 adjusts the tension on the pair of the axial parts 221, 222, and the spring constant of the axial parts 221, 222 can be adjusted. In other words, the actuator 1 has the tension adjuster 6 that adjusts the spring constant of the axial parts 221, 222 with the pair of the axial parts 221, 222 and the pair of the drive sources 61, 62.

How the tension adjuster 6 works will be now described. The action of the drive source 61 is the same as that of the drive source 62 therefore only the action of the drive source 61 is described and the description of the drive source 62 will be hereunder omitted.

Referring to FIG. 2, when the power supply circuit 83 is not in operation (in other words no voltage is applied to the piezoelectric element 81), the upper face of the piezoelectric element 81 is situated at substantially the same level as the upper face of the movable plate 21 in the thickness direction of the movable plate 21. In other words, the base body 2 is flat.

Referring to FIG. 3, when the piezoelectric element 81 is contracted by the activated power supply circuit 83, the upper end of the piezoelectric element 81 displaces downward together with the piezoelectric element joint part 251. Thereby the left side of the coupling part 241 is displaced downward in accordance with the displacement of the piezoelectric element joint part 251 and the coupling part 241 leans. By leaning the coupling part 241, the torsional axis 231 is torsionally deformed around the Y axis.

The drive source 61 is provided such that it torsionally deforms the torsional axis 231 toward the direction in which the tension of the pair of the axial parts 221, 222 is increased. In other words, the drive source 61 deforms the torsional axis 231 torsionally such that the joint part of the torsional axis 231 with the axial part 221 is displaced toward the direction in which the distance between the joint part and the movable plate 21 is increased. More specifically, the drive source 61 deforms the torsional axis 231 torsionally in a counter-clock wise direction in FIG. 2.

The spring constant of the pair of the axial parts 221, 222 can be adjusted when the drive source 61 deforms the axial part 221 torsionally toward the direction in which the distance between the joint part of the torsional axis 231 with the axial part 221 and the movable plate 21 is decreased. However, in this case, the pair of the axial parts 221, 222 can be warped and the movable plate 21 can be displaced in the thickness direction though it depends on the degree of the torsion of the torsional axis 231.

Whereas the torsional axis 231 is deformed such that the distance between the joint part of the torsional axis 231 with the axial part 221 and the movable plate 21 is increased, the warp of the axial parts 221, 222 is prevented. Therefore the actuator 1 can adjust the spring constant of the axial parts 221, 222 while securing the stable rotation of the movable plate 21. As described above, the coupling part 241 is jointed to the longitudinally center part of the torsional axis 231. The center part of the torsional axis 231 in its longitudinal direction is the part which is most deformable so that it is possible to deform the torsional axis 231 torsionally around the Y axis with a smallest force by jointing the coupling part 241 with the such part.

Moreover, since the coupling part 241 is disposed along the rotation central axis X, the force generated through the deformation of the piezoelectric element 81 can be efficiently transmitted to the torsional axis 231. Furthermore, the Y axis is situated in a position lower than the joint part of the torsional axis 231 with the axial part 221. In this way, it is possible to dispose the piezoelectric element 81 between the piezoelectric element joint part 251 and the support substrate 3. Accordingly the torsional axis 231 can be torsionally deformed toward the direction in which the tension on the axial parts 221, 222 is increased by contracting the piezoelectric element 81.

Consequently it is possible to downsize the actuator 1 because the piezoelectric element 81 is disposed in the space 41. Moreover the spring constant of the pair of the axial parts 221, 222 is adjusted by contracting the piezoelectric element 81 so that it is possible to prevent the piezoelectric element joint part 251 from protruding out of the upper face of the base body 2. In this aspect, the size of the actuator 1 can be reduced. With the drive source 61 according to the embodiment, the torsional axis 231 can be torsionally deformed by a relatively simple structure. Furthermore with such structure, a large torque for deforming the torsional axis 231 torsionally can be generated and it becomes easy to maintain the torsion of the torsional axis 231 at a desired degree.

The tension adjuster 6 has the pair of the torsional axes 231, 232 and the pair of the drive sources 61, 62 so that the spring constant of the pair of the axial parts 221, 222 can be adjusted in a wide range. By using such tension adjuster 6, it is possible to adjust the spring constant of the pair of the axial parts 221, 222 even after the actuator is completed, and possible to provide the actuator 1 which can exercise a desired vibration characteristic. Moreover the spring constant of the pair of the axial parts 221, 222 can be adjusted even when the actuator 1 is driving thereby it is possible for the actuator 1 to exert an excellent rotational characteristic.

The driver 5 that rotates the movable plate 21 is now described. As described above, the permanent magnet 51, the coil 52 and the electric current applicator 53. The permanent magnet 51 is disposed along the plate face of the movable plate 21. Referring to FIG. 1 and FIG. 5, the permanent magnet 51 has a long shape and extends along the direction orthogonal to the rotation central axis X. The permanent magnate 51 is magnetized in its longitudinal direction. More specifically, one end of the permanent magnet 51 is a north pole and the other end is a south pole with respect to the rotation central axis X.

Any magnet can be used as the permanent magnet 51, for example, neodymium magnet, ferrite magnet, samarium-cobalt magnet, and alnico magnet can be preferably used. The coil 52 is coupled to the electric current applicator 53. When an alternating current is applied to the coil 52 by the electric current applicator 53, a magnetic filed having a magnetic field line which extends around the coil 52 in a direction perpendicular to the plate face of the movable plate 21 is generated and the direction of the magnetic field is alternatively switched.

More specifically, two states alternate: one state (a first state) is that the right side of the permanent magnet 51 with respect to the rotation central axis X moves toward the coil 52 and the left part moves away from the coil 52; the other state (a second state) is that the right side of the permanent magnet 51 with respect to the rotation central axis X moves away from the coil 52 and the left part moves toward the coil 52.

The movable plate 21 rotates around the rotation central axis X as the first state and the second state are alternatively repeated. Though an alternating current is applied to the coil 52 by the electric current applicator 53 in the above-described embodiment, it is not limited to this as long as the movable plate 21 is rotated. For example, the electric current applicator 53 can apply direct current to the coil 52 intermittently.

When the actuator 1 is actuated, it is preferable that the frequency of the current (hereinafter also referred as to "driving frequency V1") applied to the coil 52 by the electric current applicator 53 be identical to the resonance frequency of the movable plate 21 (hereinafter also referred as to "resonance frequency V2"). In this way, it is possible to rotate the movable plate 21 with large amplitude as well as lowering the driving voltage level. In this description, the "resonance frequency of the movable plate 21" means a torsional resonance frequency of a vibration system including the movable plate 21 and the pair of the axial parts 221, 222. The resonance frequency of the movable plate 21 depends on the weight of the movable plate 21 (including weights of the light reflecting part 211 and the magnet 51) and the spring constant (stiffness in torsion) of the pair of the axial parts 221, 222.

The actuator 1 is set to adjust the tension on the pair of the axial parts 221, 222 (or the spring constant of the pair of the axial parts 221, 222) through the tension adjuster 6 such that the resonance frequency V2 becomes equal to the driving frequency V1. The driving frequency V1 is generally changed according to an application of the actuator 1. Therefore the resonance frequency V2 is adjusted to the driving frequency V1 and the actuator 1 which can exercise a desired vibration characteristic can be achieved.

According to the embodiment, the torsional axis 231 is torsionally deformed toward the direction in which the tension on the pair of the axial parts 221, 222 is increased or the spring constant of the pair of the axial parts 221, 222 is made higher. Thus it is preferable that the actuator 1 be designed such that the resonance frequency V2 is slightly lower than the driving frequency V1 at the time when the actuator 1 is manufactured.

How to adjust the resonance frequency V2 to the driving frequency V1 is now described. The actuator 1 has a resonance frequency detector 9 that detects the resonance frequency V2, and a controller 7 that controls the operation of the tension adjuster 6 based on the detection result of the tension adjuster 6. For example, the resonance frequency detector 9 detects the resonance frequency V2 right after the power activation of the actuator 1 is performed, the controller 7 then controls the operation of the power supply circuit 83 based on the detected resonance frequency V2. The detection of the resonance frequency V2 by the resonance frequency detector 9 is not necessarily performed right after the power activation, the detection of the resonance frequency V2 can be for example conducted at regular time intervals after the power activation.

The resonance frequency detector 9 is disposed on the axial part 221. The resonance frequency detector 9 includes a detection element 91 whose resistance value is changed in accordance with its deformation, and a detection part 92. The detection part 92 detects the behavior (or vibration amplitude) of the movable plate 21 based on the resistance value change of the detection element 91 and determines the resonance frequency V2 from the detected behavior of the movable plate 21. Since the axial part 221 torsionally deforms around the rotation central axis X when the movable plate 21 rotates, the detection element 91 that is disposed on the axial part 221 is deformed according to the torsional deformation of the axial part 221. Thereby the resistance value of the detection element 91 changes.

The detection part 92 has for example an unshown power source unit which applies an voltage to the detection element 91 and an unshown electric current measurement part that detects an electric current change (or the resistance value change of the detection element 91) in the circuit including the power source unit and the detection element 91. The behavior of the movable plate 21 is detected based on the change in the electric current value detected by the electric current measurement part, and the resonance frequency V2 is determined based on the detection result.

The controller 7 for example increases the voltage which is applied to the piezoelectric element 81 and supplied from the power supply circuit 83 (the same thing can be applied to the voltage supplied from the power supply circuit 84 and applied to the piezoelectric element 82) till the resonance frequency V2 becomes same as the driving frequency V1. In other words, the controller 7 gradually contracts the piezoelectric element 81 and then controls the power supply circuit 83 such that the voltage which is supplied from the power supply circuit 83 and applied to the piezoelectric element 81 is maintained at a value where the resonance frequency V2 becomes identical to the driving frequency V1. In this way, the actuator 1 adjusts the resonance frequency V2 to the driving frequency V1. The controller 7 controls the operation of the power supply circuit 83 when it is necessary. Therefore if a given driving frequency V1 corresponds with a resonance frequency V2 which is detected by the resonance frequency detector 9, the power supply circuit 83 does not have to be operated.

The controller 7 does not necessarily control the power supply circuit 83 such that its voltage is gradually increased. For example, several voltage values corresponding to margins between the resonance frequency V2 and the driving frequency V2 can be given in advance, and the controller 7 can control the power supply circuit 83 such that it applies a selected voltage which is selected out of the given voltage values based on the detection result of the resonance frequency detector 9.

The actuator according to the embodiment has been described. The actuator has the light-reflecting part thereby the actuator 1 can be applied to various optical devices such as an optical scanner, an optical switch and an optical attenuator.

An optical scanner according to an embodiment of the invention has the same structure as the above-described actuator except that a light-reflecting part having a light-reflection property is provided on one face of the movable plate. Therefore the embodiment of the optical scanner will not be described in detail here. The optical scanner according to the embodiment can be applied to various image forming device such as a projector, a laser printer, a display for imaging, a bar-code reader and a confocal scanning microscope. Consequently it is possible to provide an image forming device that has a fine image drawing characteristic.

Figure 7:
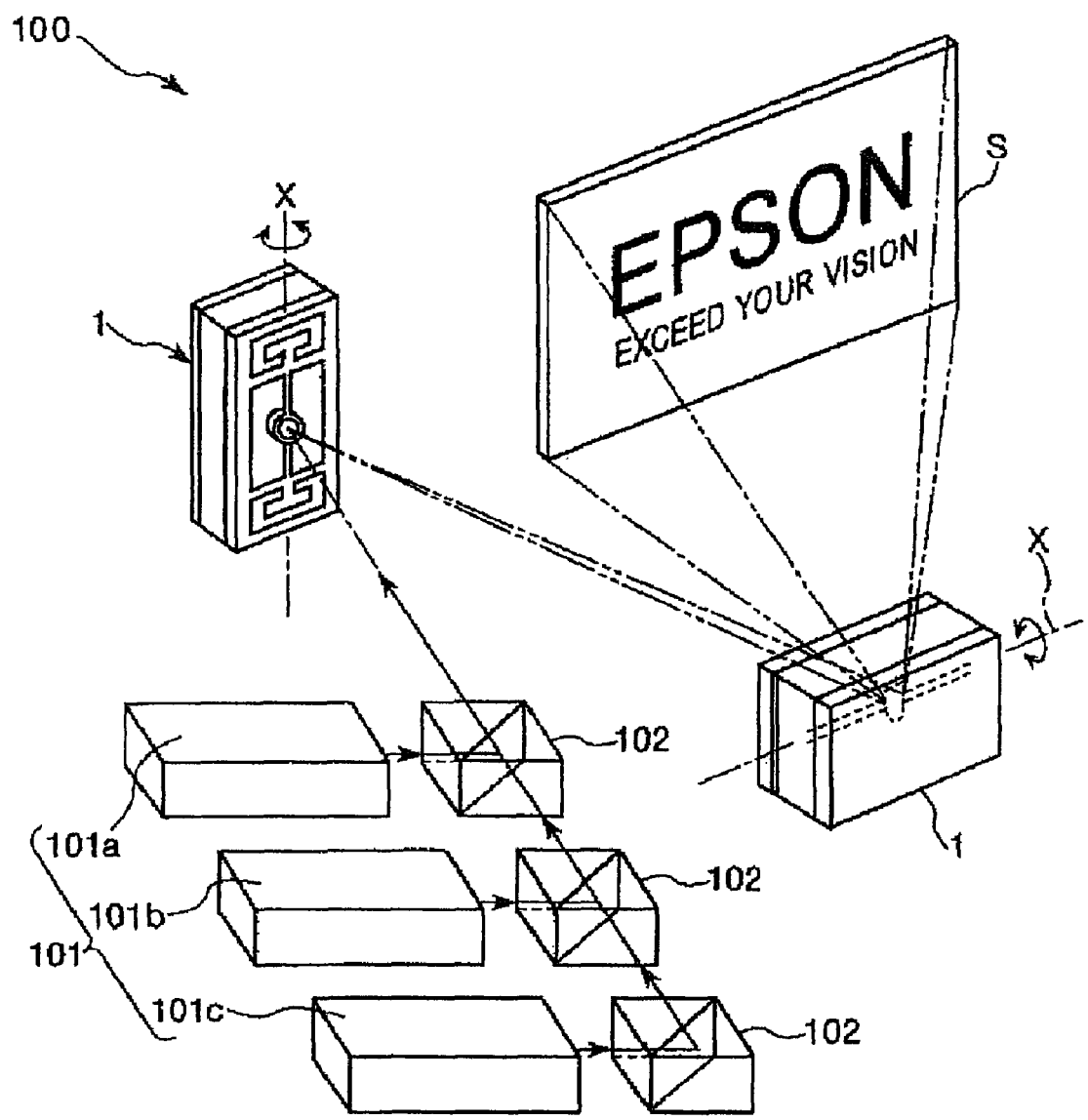
FIG. 7 is a schematic view of an image forming device equipped with the actuator shown in FIG. 1.

A projector 100 using the actuator 1, which is a specific example of the image forming device, is now described with reference to FIG. 7. A longitudinal direction of a screen S is refereed as a "transverse direction" and an orthogonal direction to the longitudinal direction is referred as a "vertical direction" for convenience of explanation. The projector 100 has a light-source unit 101 that emits light such as a laser beam, a plurality of dichroic mirrors 102 and a pair of the actuators 1, 1.

The light-source unit 101 includes a red light source device 101a that emits a red light beam, a blue light source device 101b that emits a blue light beam, and a green light source device 101c that emits a green light beam. The dichroic mirror is composed of four rectangular prisms which are bonded together and is an optical element which combines the light beams emitted from the red light source device 101a, the blue light source device 101b and the green light source device 101c. The combined light beam is scanned by the actuators 1, 1 and it forms a color image on the screen S.

Optical scanning by the actuators 1, 1 is described in detail. The light beam combined at the dichroic mirrors 102 is scanned (main scanning) in the transverse direction of the screen S by one of the actuators 1, 1. The transversely scanned light beam is then scanned (vertical scanning) in the vertical direction of the screen S by the other actuator 1. Through such process, a two-dimension colored image can be formed on the screen S.

Though the actuator, the optical scanner and the image forming device according to the embodiment have been described with reference to the accompanying drawings, the invention is obviously not limited to the specific embodiments described herein, but also encompasses any variations that may be considered by any person skilled in the art, within the general scope of the invention. The invention concerning the actuator, the optical scanner and the image forming device also encompasses the constructions that serve the equivalent function and exert the equivalent effect as those of the embodiments. The invention also encompasses the structure in which a hitherto know art is added to the structure described in the above embodiments.

Though the actuator has the symmetrical structure with respect to the movable plate in the above-described embodiment, the actuator 1 may have a asymmetrical structure. Moreover, through the tension adjuster has the pair of the torsional axes which is provided corresponding to the pair of the axial parts, and the pair of the drive sources which is provided corresponding to the pair of the torsional axes, the structure is not limited to this provided that it has at least a pair of the torsional axis and the drive source. Where the actuator has only a pair of the torsional axis and the drive source, an end of the axial part that is not coupled with the torsional axis in the two axial parts is fixed to the frame-shaped support part.

Moreover, the piezoelectric element has the layered structure in the embodiment. However the element can have a single-layer structure as long as the piezoelectric element joint part can be displaced. Though the torsional axis is torsionally deformed when the piezoelectric element is contracted in the above-described embodiment, the torsional axis can be torsionally deformed when the piezoelectric element is elongated. Furthermore, so-called electromagnetic driving method using the permanent magnet and the coil is adopted as the driving means which rotates the movable plate in the embodiment. However other methods can be adopted to drive the movable plate. For example, a so-called piezoelectric driving method in which the axial part is torsionally deformed through contraction and elongation of a piezoelectric element and the movable plate is rotated, a so-called electrostatic driving method in which the movable plate is rotated through a coulomb force generated between the movable plate and the support substrate, or the like can be adopted.

What is claimed is:

1. An actuator, comprising:
a movable plate having a plate shape;
a pair of axial parts that is elastically deformable and supporting the movable plate rotatable;
a tension adjuster adjusting tension on an axial direction of the pair of the axial parts;
a driver rotating the movable plate including a permanent magnet, a coil and an electric current applicator; and
a resonance frequency detector disposing on the one of the axial parts and detecting a resonance frequency of the movable plate while adjusting tension in the axial direction of the pair of axial parts.

2. An optical scanner, comprising:
a movable plate having a plate shape and having a light reflecting part that has a light reflecting property and is disposed on a plate face of the movable plate;
a pair of axial parts that is elastically deformable and supporting the movable plate rotatable;
a tension adjuster adjusting tension on an axial direction of the pair of the axial parts;
a driver rotating the movable plate including a permanent magnet, a coil and an electric current applicator; and
a resonance frequency detector disposing on the one of the axial parts and detecting a resonance frequency of the movable plate while adjusting tension in the axial direction of the pair of axial parts.

3. An image forming device comprising:
an optical scanner including:
a movable plate having a plate shape and having a light reflecting part that has a light reflecting property and is disposed on a plate face of the movable plate;
a pair of axial parts that is elastically deformable and supporting the movable plate rotatable;
a tension adjuster adjusting tension on an axial direction of the pair of the axial parts;
a driver rotating the movable plate including a permanent magnet, a coil and an electric current applicator; and
a resonance frequency detector disposing on the one of the axial parts and detecting a resonance frequency of the movable plate while adjusting tension in the axial direction of the pair of axial parts.

* * * * *